United States Patent
Park et al.

(10) Patent No.: US 9,123,164 B2
(45) Date of Patent: Sep. 1, 2015

(54) 3D IMAGE ACQUISITION APPARATUS AND METHOD OF EXTRACTING DEPTH INFORMATION IN 3D IMAGE ACQUISITION APPARATUS

(71) Applicant: SAMSUNG ELECTRONICS CO., LTD., Suwon-si (KR)

(72) Inventors: Yong-hwa Park, Yongin-si (KR); Jang-woo You, Yongin-si (KR); Hee-sun Yoon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 13/759,566

(22) Filed: Feb. 5, 2013

(65) Prior Publication Data
US 2013/0201183 A1 Aug. 8, 2013

(30) Foreign Application Priority Data

Feb. 7, 2012 (KR) ........................ 10-2012-0012526

(51) Int. Cl.
| | |
|---|---|
| G06T 15/00 | (2011.01) |
| G06T 15/08 | (2011.01) |
| G01S 17/08 | (2006.01) |
| G01S 17/89 | (2006.01) |

(52) U.S. Cl.
CPC ................ *G06T 15/08* (2013.01); *G01S 17/08* (2013.01); *G01S 17/89* (2013.01)

(58) Field of Classification Search
USPC ........................................... 345/419; 348/46
See application file for complete search history.

(56) References Cited

U.S. PATENT DOCUMENTS

| | | | |
|---|---|---|---|
| 4,935,616 | A | 6/1990 | Scott |
| 5,081,530 | A | 1/1992 | Medina |
| 5,694,203 | A | 12/1997 | Ogawa |
| 6,057,909 | A | 5/2000 | Yahav et al. |
| 6,088,086 | A | 7/2000 | Muguira et al. |
| 6,091,175 | A | 7/2000 | Kinsinger |
| 6,100,517 | A | 8/2000 | Yahav et al. |
| 6,323,942 | B1 | 11/2001 | Bamji |
| 6,331,911 | B1 | 12/2001 | Manassen et al. |
| 6,822,681 | B1 | 11/2004 | Aoki |

(Continued)

FOREIGN PATENT DOCUMENTS

| | | |
|---|---|---|
| JP | 2005-214743 A | 8/2005 |
| KR | 10-0957467 B1 | 5/2010 |

OTHER PUBLICATIONS

R. Miyagawa et al., "CCD-Based Range-Finding Sensor", IEEE Transactions on Electron Devices, vol. 44, No. 10, Oct. 1997, p. 1648-1652.

*Primary Examiner* — Peter Hoang
(74) *Attorney, Agent, or Firm* — Sughrue Mion, PLLC

(57) ABSTRACT

A method for extracting depth information, which may include extracting depth information relating to an object by using an actual nonlinear waveform instead of a mathematically ideal waveform and simultaneously may include effectively removing errors due to random noises that may be caused in a light source, an light modulator, an imaging device, or the like, is provided. The method may include performing simple multiplex and addition on captured images and performing a search of a look-up table. Thus, correct distance information may be extracted without being affected by a type of waveform being used, and an amount of memory which is used and calculated for removing random noise may be reduced.

15 Claims, 10 Drawing Sheets

(56) References Cited

U.S. PATENT DOCUMENTS

| | | |
|---|---|---|
| 6,856,355 B1 | 2/2005 | Ray et al. |
| 7,016,519 B1 | 3/2006 | Nakamura et al. |
| 7,060,957 B2 | 6/2006 | Lange et al. |
| 7,095,487 B2 | 8/2006 | Gonzalez-Banos et al. |
| 7,230,685 B2 | 6/2007 | Suzuki et al. |
| 7,573,564 B2 | 8/2009 | Ruff et al. |
| 7,917,320 B2 | 3/2011 | Levesque et al. |
| 7,986,397 B1 | 7/2011 | Tiemann et al. |
| 2002/0185590 A1 | 12/2002 | Yahav et al. |
| 2005/0162638 A1 | 7/2005 | Suzuki et al. |
| 2005/0280801 A1 | 12/2005 | Gonzalez-Banos et al. |
| 2006/0192938 A1 | 8/2006 | Kawahito |
| 2010/0153062 A1* | 6/2010 | Maltseff ................ 702/159 |
| 2010/0165323 A1 | 7/2010 | Fiess et al. |

* cited by examiner

3D IMAGE ACQUISITION APPARATUS AND METHOD OF EXTRACTING DEPTH INFORMATION IN 3D IMAGE ACQUISITION APPARATUS

CROSS-REFERENCE TO RELATED APPLICATIONS

This application claims priority from Korean Patent Application No. 10-2012-0012526, filed on Feb. 7, 2012, in the Korean Intellectual Property Office, the disclosure of which is incorporated herein by reference in its entirety.

BACKGROUND

1. Field

Exemplary embodiments relate to three-dimensional (3D) image acquisition apparatuses and methods for extracting depth information in which are executable by using the 3D image acquisition apparatuses, and more particularly, to a method for extracting depth information, which may include extracting depth information relating to an object by using an actual nonlinear waveform instead of a mathematically ideal waveform and simultaneously may include effectively removing errors due to random noises that may be caused in a light source, an light modulator, an imaging device, or the like.

2. Description of the Related Art

As the demand for three-dimensional (3D) display apparatuses has increased, the use of and request for 3D contents have also increased. Accordingly, 3D image acquisition apparatuses, such as 3D cameras for producing 3D contents, have been developed. A 3D camera should acquire general two-dimensional (2D) color image information in conjunction with corresponding depth information via one photographing operation.

The depth information regarding a distance between surfaces of a target object and the 3D camera may be obtained by performing a stereo vision method using two cameras, or by performing a triangulation method using a structured light and a camera. However, as the distance from the target object is increased, the accuracy of the depth information sharply deteriorates when the aforementioned methods are used. In addition, the depth information varies with the states of the surfaces of the target object, and thus, it can be difficult to acquire accurate depth information when these methods are used.

In order solve these problems, a Time-of-Flight (TOF) method has been developed. In the TOF method, illumination light is irradiated toward a target object, and then an optical flight time until light reflected from the target object is received by a light receiving unit is measured. The illumination light has a particular wavelength (e.g., a near infrared ray of 850 nm) and is irradiated toward the target object by using an illuminating optical system which includes a light-emitting diode (LED) or a laser-diode (LD), and light that has the same wavelength and is reflected from the target object is received by the light receiving unit. Thereafter, a series of processes in which the received light is modulated by using a modulator having a known gain waveform are performed to extract depth information. Various TOF methods using predetermined series of optical processes have been introduced.

For optical processes for extracting depth information obtained by using TOF methods, each of a method of pulse driving a light source and a light modulation device, a method of using a particular waveform such as a triangular wave (e.g., a ramp waveform), and a method of using a sine wave has been introduced. In addition, various methods of driving a light source and a light modulation device and various algorithms for extracting depth information of a photographed intensity values have been introduced.

However, in the above-described TOF methods, errors may occur in depth information due to following two factors. A first factor is structural distortion of a waveform of light. In general, when depth information is extracted, it is assumed that the waveform approximates an ideal waveform, such as a pulse, a triangular wave, a sine wave, or the like. However, in reality, it may be difficult to obtain an accurate ideal waveform due to an operational error and a nonlinearity of a light source or a light modulation device. A difference between an ideal waveform and an actual waveform may cause errors with respect to calculating depth information. In addition, random noises may generally exist in an imaging device such as, for example, an actual light source, a light modulator, and a charge-doubled device (CCD), due to instability of power, heat, external electromagnetic wave interference, and the like. Such random noises may cause errors during extraction of depth information. In general, in order to remove random noises, a single image is formed by obtaining a plurality of images within a period of time corresponding to one frame and leveling the images. However, since an imaging device such as a CCD typically has a capacity of between several hundreds of thousands of pixels and several tens of millions of pixels, the required amount of a memory may geometrically increase in a case of performing a general leveling method.

SUMMARY

Provided are methods for extracting depth information relating to an object by using an actual nonlinear waveform instead of a mathematically ideal waveform.

Provided are methods for extracting depth information, which effectively removes errors due to random noises that may be caused in a light source, an light modulator, an imaging device, or the like, at least one of which is used in a three-dimensional (3D) image acquisition apparatus.

Provided are 3D image acquisition apparatuses for extracting distance information by using the method.

Additional aspects will be set forth in part in the description which follows and, in part, will be apparent from the description, or may be learned by practice of the presented exemplary embodiments.

According to an aspect of an exemplary embodiment, a method for extracting depth information includes sequentially projecting a natural number N respective projection light beams toward an object; modulating N reflection light beams which are correspondingly reflected from the object by using a light modulation signal; generating N images by photographing the N reflection light beams; generating a first weighted image U by performing a first multiplying operation which includes multiplying each respective one of the N generated images by respective first weights and adding the weighted images resulting from the first multiplying operation, and generating a second weighted image V by performing a second multiplying operation which includes multiplying each respective one of the N generated images by respective second weights that are respectively different from the corresponding first weights and adding the weighted images resulting from the second multiplying operation; and calculating a distance relating to the object based on a ratio between the first weighted image U and the second weighted image V by using a look-up table that includes measurement information relating to the N respective projection light beams and the light modulation signal.

The N respective projection light beams may include periodic waves having a same period, wherein at least one of waveforms, amplitudes, and phases of the N respective projection light beams vary between respective ones of the N respective projection light beams.

The light modulation signal may have the same period as the N respective projection light beams.

Each of the N respective projection light beams and the light modulation signal may have at least one of a sine wave, a triangular wave, a rectangular wave, a square wave, and a general waveform which is obtainable by combining at least two of a sine wave, a triangular wave, a rectangular wave, and a square wave, and which are expressible as a sum of a plurality of high-order sine terms and high-order cosine terms.

The first weighted image U may be generated by using the respective first weights A1 to AN that respectively correspond to the N images, and the second weighted image V may be generated by using the respective second weights B1 to BN that respectively correspond to the N images.

The respective first weights and the respective second weights may be calculated based on measurements relating to the N respective projection light beams and the light modulation signal.

Each of a plurality of look-up tables may correspond to a respective one of a plurality of possible combinations of the N respective projection light beams and the light modulation signal, and the calculating the distance relating to the object may be performed by using a respective one of the plurality of look-up tables which corresponds to a combination of the N respective projection light beams and the light modulation signal which has been used.

For example, the respective one of the plurality of look-up tables may include at least one of a first look-up table which includes information relating to a relationship between a phase delay and an arctangent of the ratio between the first weighted image U and the second weighted image V; a second look-up table which includes information relating to a relationship between the distance relating to the object and the arctangent of the ratio between the first weighted image U and the second weighted image V; and a third look-up table which includes information relating to a relationship between the distance relating to the object and the ratio between the first weighted image U and the second weighted image V.

The look-up table may be generated by using a method including obtaining polynomials which represent respective waveforms of each of the N respective projection light beams and the light modulation signal by performing a respective measurement which relates to each of the N respective projection light beams and the light modulation signal; obtaining polynomials which respectively relate to each of the N images by using the obtained polynomials which represent the respective waveforms of each of the N respective projection light beams and the light modulation signal; defining the polynomials which respectively relate to each of the N images by using a sum of phase functions relating to phase delays and constant terms that are not related to a phase delay; defining a phase vector function relating to a phase delay with respect to a multidimensional space by using combinations of respective differences of N phase functions; defining a first normal vector and a second normal vector that are orthogonal to each other within the multidimensional space; determining a theoretical relationship between a phase delay and a ratio of a first normal vector direction component and a second normal vector direction component of the defined phase vector function; and generating the look-up table by using the determined theoretical relationship.

The polynomials representing the respective waveforms of the N respective projection light beams and the light modulation signal may be expressible as a sum of a plurality of high-order sine terms and high-order cosine terms which are determined by using a Fourier analysis.

The defining the polynomials which respectively relate to each of the N images may include deriving N polynomials which respectively relate to reflection light obtained by reflecting the N respective projection light beams from the object from corresponding polynomials which respectively relate to the N respective projection light beams; obtaining N polynomials which relate to modulated light by multiplying each of the derived N polynomials which respectively relate to the reflection light with a polynomial which relates to the light modulation signal; and obtaining the polynomials which respectively relate to the N images by integrating each of the obtained N polynomials which relate to the modulated light.

For example, in the defining the polynomials which respectively relate to each of the N images, only a direct current (DC) term which is included in the polynomials which respectively relate to each of the N images may be considered.

For example, the phase vector function may be defined as $\vec{F}(\phi_{TOF}) = [F^{(12)}(\phi_{TOF}), F^{(23)}(\phi_{TOF}), \ldots, F^{(N-1,N)}(\phi_{TOF})]^T$, wherein $F^{(ij)}(\phi_{TOF}) = F^{(i)}(\phi_{TOF}) - F^{(j)}(\phi_{TOF})$ (i, j=1, 2, through N, i≠j) and $F^{(i)}(\Phi_{TOF})$ may be a phase function which relates to an $i_{th}$ projection light beam.

In addition, the first normal vector may be defined as $\hat{x} = \vec{F}(0°)/\|\vec{F}(0°)\| = [x_1 \ x_2 \ldots x_{N-1}]^T$, wherein $\vec{F}(0°) = [F^{(12)}(0°), F^{(23)}(0°), \ldots, F^{(N-1,N)}(0°)]^T$, and wherein the second normal vector may be defined as $\hat{y} = \vec{Y}/\|\vec{Y}\| = [y_1 \ y_2 \ldots y_{N-1}]^T$, wherein $\vec{Y} = \vec{F}(90°) - [\vec{F}(90°)^T \hat{x}]\hat{x}$.

For example, the respective first weights may include N different weight components $A_1$ to $A_N$, wherein $A_1 = x_1$ $A_k = x_k - x_{k-1}$ for $k = 2 \sim N-1$ $A_N = -x_{N-1}$, and the respective second weights may include N different weight components $B_1$ to $B_N$, wherein $B_1 = y_1$ $B_k = y_k - y_{k-1}$ for $k = 2 \sim N-1$ $B_N = -y_{N-1}$.

The method may further include generating at least one new image by projecting at least one respective projection light beam toward the object, wherein the at least one new image comprises a number of new images which is not greater that (N−1); removing one of the N images that were originally generated for each of the generated at least one new image; generating new respective first weighted images and new respective second weighted images by respectively multiplying each respective one of the remaining N images by each of the respective first weights and by each of the respective second weights; calculating a new ratio between the new respective first weighted images and the new respective second weighted images; and calculating a new distance which relates to the object, based on the calculated new ratio, by using the look-up table.

According to another aspect of an exemplary embodiment, a method for extracting depth information includes sequentially projecting a natural number N identical projection light beams toward an object; modulating N reflection light beams which are correspondingly reflected from the object by using N respective light modulation signals; generating N images by photographing the N reflection light beams; generating a first weighted image U by performing a first multiplying operation which includes multiplying each respective one of the N generated images by respective first weights and adding the weighted images resulting from the first multiplying operation, and generating a second weighted image V by performing a second multiplying operation which includes multiplying each respective one of the N generated images by respective second weights that are respectively different from the corresponding first weights and adding the weighted images resulting from the second multiplying operation; and calculating a distance relating to the object based on a ratio between the first weighted image U and the second weighted image V by using a look-up table that includes measurement information relating to the N respective light modulation signals and one of the identical projection light beams.

In this case, the look-up table may be generated by using a method including obtaining polynomials which represent respective waveforms of one of the identical projection light beams and each of the N respective light modulation signals by performing a respective measurement which relates to each of the one projection light beam and the N respective light modulation signals; obtaining polynomials which respectively relate to each of the N images by using the obtained polynomials which represent the respective waveforms; defining the polynomials which respectively relate to each of the N images by using a sum of phase functions relating to phase delays and constant terms that are not related to a phase delay; defining a phase vector function relating to a phase delay with respect to a multidimensional space by using combinations of respective differences of N phase functions; defining a first normal vector and a second normal vector that are orthogonal to each other within the multidimensional space; determining a theoretical relationship between a phase delay and a ratio of a first normal vector direction component and a second normal vector direction component of the defined phase vector function; and generating the look-up table by using the determined theoretical relationship.

Each of a plurality of look-up tables may correspond to a respective one of a plurality of possible combinations of the one identical projection light beam and the N respective light modulation signals, and the calculating the distance relating to the object may be performed by using a respective one of the plurality of look-up tables which corresponds to a combination of the one identical projection light beam and the N respective light modulation signals which has been used.

According to another aspect of an exemplary embodiment, a three-dimensional (3D) acquisition apparatus includes a light source which projects projection light toward an object; a light modulator which modulates reflection light that is reflected from the object by using a light modulation signal; an imaging device which generates an image by photographing light that is modulated by the light modulator; and a depth information image processor which calculates a distance relating to the object by using the image generated by the imaging device, wherein the depth information image processor extracts depth information by using the above-described method.

The 3D acquisition apparatus may further include a light source driver which drives the light source to control a waveform of projection light; a light modulator driver which drives the light modulator to control a gain waveform of the light modulation signal; and a controller which controls operations of the light source driver, the light modulator driver, and the imaging device.

For example, the imaging device may use a charge-doubled device (CCD) image sensor, a complementary metal-oxide semiconductor (CMOS), and at least one of a single photodiode and a photo diode array, which array includes at least one of a one-dimensional array and a two-dimensional array, for measuring a distance relating to a single point.

The 3D acquisition apparatus may further include a memory which stores the look-up table, and which stores the respective first weights and the respective second weights that are calculated based on measurements relating to the projection light and the light modulation signal.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
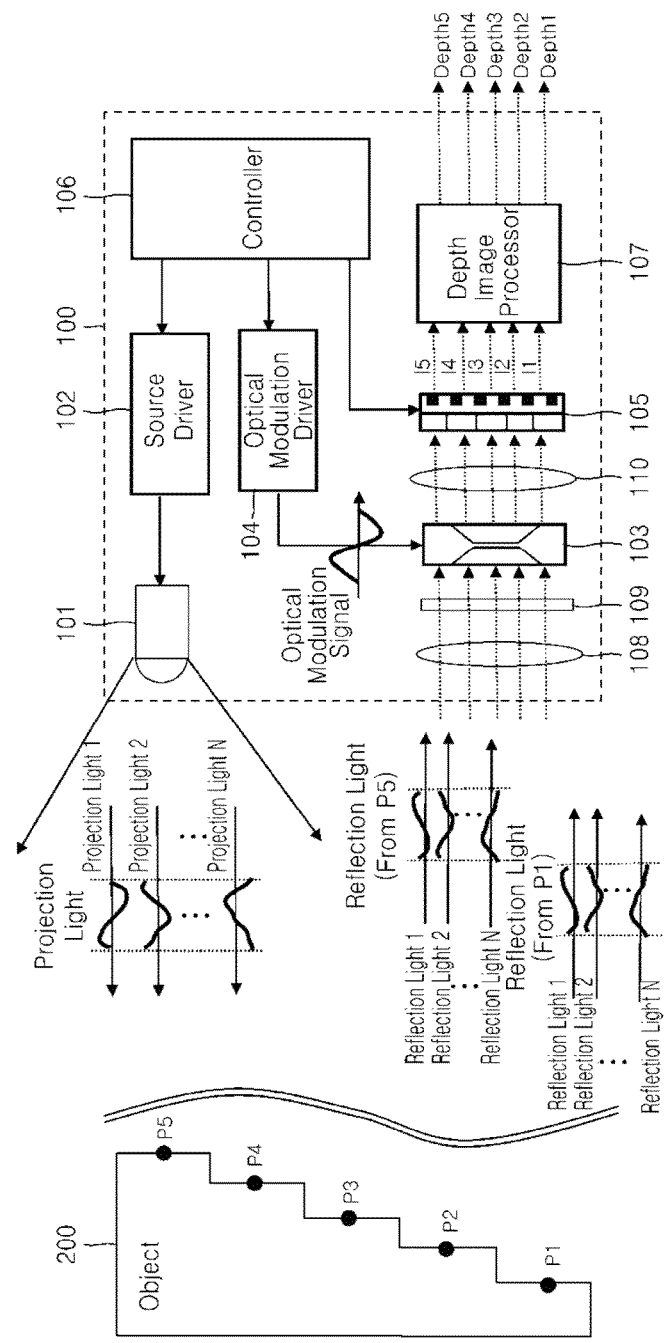
FIG. 1 is a diagram of a three-dimensional (3D) acquisition apparatus for extracting depth information by using a Time-of-Flight (TOF) method, according to an exemplary embodiment.

Reference will now be made in detail to exemplary embodiments, examples of which are illustrated in the accompanying drawings, wherein like reference numerals refer to the like elements throughout and sizes of components may be exaggerated for clarity.

FIG. 1 is a diagram of a three-dimensional (3D) acquisition apparatus 100 for extracting depth information by using a Time-of-Flight (TOF) method, according to an exemplary embodiment. Referring to FIG. 1, the 3D acquisition apparatus 100 may include a light source 101 which generates light having a predetermined wavelength, a light source driver 102 which drives the light source 101, a light modulator 103 which modulates light reflected from an object 200, a light modulator driver 104 which drives the light modulator 103, an imaging device 105 which generates an intensity image from the light modulated by the light modulator 103, a depth image processor 107 which calculates depth information, based on the intensity image generated by the imaging device 105, and a controller 106 which controls operations of the light source driver 102, the light modulator driver 104, the imaging device 105, and the depth image processor 107. A first lens 108 which concentrates reflected light on a region of the light modulator 103 and a filter 109 which transmits light having a predetermined wavelength only may be further disposed on a light incident surface of the light modulator 103. In addition, a second lens 110 which concentrates an image with modulated light on a region of the imaging device 105 may be further disposed between the light modulator 103 and the imaging device 105.

The light source 101 may include, for example, a light-emitting diode (LED) or a laser diode (LD) for emitting light which has a near infrared (NIR) wavelength of about 850 nm that is invisible to the human eye for safety. However, a wavelength band and a type of the light source 101 are not particularly limited. The light source driver 102 may control the light source 101 based on a control signal received from the controller 106 by using, for example, an amplitude modulation method or a phase modulation method. According to a drive signal of the light source driver 102, projection light that is projected from the light source 101 toward the object 200 may have a type of a periodic continuous function having a predetermined period. For example, the projection light may have a waveform that is particularly defined, such as, for example, one of a sine wave, a triangular wave, a rectangular wave, a square wave, and the like, or alternatively, the projection light may have a waveform having a general shape that is obtainable by combining waveforms of the aforementioned types of waveforms. The waveform of the projection light may be expressible as a combination of a plurality of high-order sine terms and high-order cosine terms in order to perform Fourier analysis that will be described below.

Figure 2:
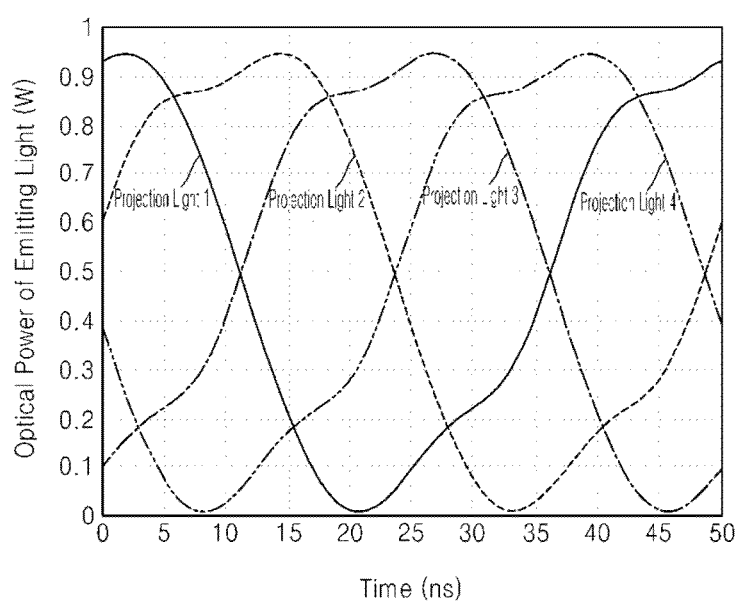
FIG. 2 is a graph of an example of a waveform of light that is output from a light source.

However, in general, although an ideal waveform is input to the light source 101, the light source 101 does not output an ideal waveform due to the nonlinearity and signal distortion introduced by the light source 101, which operates as an error when depth information is extracted. FIG. 2 is a graph of a waveform of output light that is actually output from the light source 101. As shown in FIG. 2, the waveform of the actual output light may be distorted or may have some direct current (DC) offsets as compared with an ideal sine wave. In the 3D acquisition apparatus 100, the actual output waveform is measured and the measurement result is used to calculate depth information, as described below. Thus, because output light having a distorted waveform may be used in the 3D acquisition apparatus 100, an expensive waveform generator or an expensive light source may not be used in the 3D acquisition apparatus 100. In addition, the light source 101 of the 3D acquisition apparatus 100 may output light having a general shape which is obtainable by combining two or more of a sine wave, a triangular wave, a square wave, and the like, but not a single standard waveform type.

The light modulator 103 modulates light reflected from the object 200 based on control performed by the light modulator driver 104. The light modulator driver 104 drives the light modulator 103 based on a control signal received from the controller 106. For example, the light modulator 103 may change a gain and an amplitude of reflected light based on a light modulation signal having a predetermined wavelength, which is provided by the light modulator driver 104. To this end, the light modulator 103 has a variable gain. The light modulator 103 may operate at a high light modulation speed of between several tens of MHz and several hundreds of MHz in order to differentiate light phase differences or light movement periods of time based on a distance. To this end, examples of the light modulator 103 may include an image intensifier including a multi-channel plate (MCP), a GaAs-based solid modulating device, and a thin modulating device using an electro-optic material. FIG. 1 shows a case where the light modulator 103 is embodied as a transmissive light modulator. Alternatively, a reflective light modulator may be used.

Figure 3:
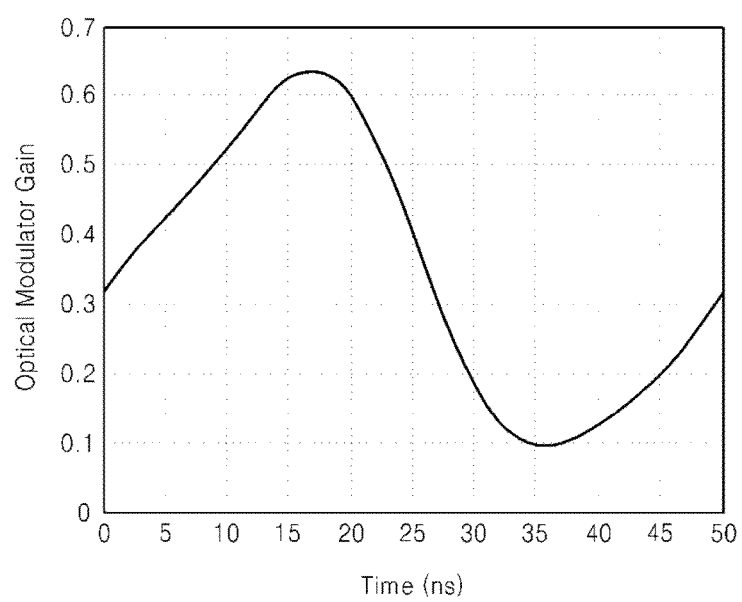
FIG. 3 is a graph is an example of a gain waveform of an light modulator.

FIG. 3 shows a waveform of an actual light modulation signal of the light modulator 103, that is, a waveform as transmitted, as a function of time. An operational frequency of the light modulator 103 may be configured to correspond to an operational frequency of the light source 101. As shown in FIG. 3, the light modulator 103 may also have nonlinearity and a DC offset, similarly as the light source 101. Thus, distortion exists in the actual gain wavelength of the light modulator 103, unlike in a gain waveform of an ideal light modulator. The distortion of the gain waveform of the light modulator 103 may also cause errors. In the 3D acquisition apparatus 100, the actual gain waveform of the light modulator 103 is measured, and the measurement result is used to calculate depth information, as described below. Thus, the 3D acquisition apparatus 100 according to the present exemplary embodiment may use a general light modulator in which distortion may occur. The gain waveform of the light modulator 103 may include another general waveform having various types of waveforms as components, as well as a single waveform. The gain waveform of the light modulator signal may be expressible as a combination of a plurality of high-order sine terms and high-order cosine terms in order to perform Fourier analysis that will be described below.

The imaging device 105 detects reflection light that is modulated by the light modulator 103 based on a control of the controller 106 and generates an intensity image. If only a distance to any one point of the object 200 is to be measured, the imaging device 105 may use a single optical sensor, for example, a photodiode or an integrator. However, if a respective plurality of distances to a corresponding plurality of points of the object 200 are to be measured, the imaging device 105 may include a plurality of photodiodes or a two-dimensional array or a one-dimensional array of other photodetectors. For example, the imaging device 105 may include a complementary metal-oxide semiconductor (CMOS) or a charge-coupled device (CCD) having a two-dimensional array. The depth image processor 107 calculates depth information based on a depth information extracting algorithm, based on an output of the imaging device 105. The depth image processor 107 may be embodied by, for example, a dedicated integrated circuit (IC) or embodied by software installed in the 3D acquisition apparatus 100. When the depth image processor 107 is embodied by software, the depth image processor 107 may be stored in a separate moveable storage medium.

Hereinafter, an operation of the 3D acquisition apparatus 100 having the above-described structure will be described.

First, the light source 101 sequentially projects N different projection light beams having a predetermined period and waveform toward the object 200, based on control of the controller 106 and the light source driver 102. In this case, N may be a natural number which is equal to or greater than 3. For example, when 4 different projection light beams are used, projection light 1 may be generated for a time T1 and may be projected toward the object 200, projection light 2 may be generated for a next time T2 and may be projected toward the object 200, projection light 3 may be generated for a time T3 and may be projected toward the object 200, and then projection light 4 may be generated for a time T4 and may be projected toward the object 200. The projection light beams that are sequentially projected toward the object 200 may each have a waveform having a predetermined period, such as, for example, a sine wave. For example, the projection light 1, the projection light 2, the projection light 3, and the projection light 4 may be periodic waves for which respective periods are the same and for which only waveforms, amplitudes, or phases vary. According to the present exemplary embodiment, because a waveform of projection light that is actually projected is measured and depth information is calculated, a shape of a waveform, a period, and an amplitude of projection light are not particularly limited. However, all projection light beams may have the same period.

Projection light which is projected toward the object 200 is reflected from a surface of the object 200 and then is incident on the first lens 108. In general, the object 200 has a plurality of surfaces to which distances from the 3D acquisition apparatus 100, that is, depths, are different from each other. For convenience of description, FIG. 1 shows the object 200 having five surfaces P1, P2, P3, P4, and P5 to which respective depths are different. Five reflection light beams in which different time delays are generated (that is, the five reflection light beams having different respective phases) are generated while projection light is reflected from each of the five surfaces P1 to P5. For example, five reflection light beams 1 having different phases are generated while the projection light 1 is reflected from each of the five surfaces P1 to P5 of the object 200, five reflection light beams 2 having different phases are generated while the projection light 2 is reflected from each of the five surfaces P1 to P5 of the object 200, and similarly, five reflection light beams N having different phases are generated while projection light N are reflected from each of the five surfaces P1 to P5 of the object 200. Reflection light reflected from the surface P1 to which a distance is longest from the 3D acquisition apparatus 100 may reach the first lens 108 after a longer time delay than reflection light reflected from the surface P5 to which a distance is shortest from the 3D acquisition apparatus 100.

The first lens 108 focus reflection light on a region of the light modulator 103. The filter 109, which transmits only light having a predetermined wavelength, may be disposed between the first lens 108 and the light modulator 103 in order to remove background light or spill light other than light having a usable wavelength. For example, when the light source 101 emits light which has a NIR wavelength of about 850 nm, the filter 109 may include a NIR band pass filter for transmitting light having a NIR wavelength of about 850 nm. Thus, light incident on the light modulator 103 may nearly correspond to light that is emitted from the light source 101 and is reflected from the object 200. FIG. 1 shows a case where the filter 109 is disposed between the first lens 108 and the light modulator 103. Alternatively, positions of the first lens 108 and the filter 109 may be reversed. For example, near infrared rays that are first transmitted through the filter 109 may be focused on the light modulator 103 by the first lens 108.

Then, the light modulator 103 modulates reflection light by using a light modulator signal having a predetermined waveform. A period of a gain waveform of the light modulator 103 may be the same as a period of a waveform of projection light. According to the present exemplary embodiment, an actual gain waveform of the light modulator 103 is measured and depth information is calculated, and a type of a waveform of the light modulator 103 is not particularly limited. In FIG. 1, the light modulator 103 may modulate the five reflection light beams 1 that are respectively reflected from each of the five surfaces P1 to P5 of the object 200 and may provide the modulated light beams to the imaging device 105 and then may modulate the five reflection light beams which correspond to each of projection light 2 to projection light N and may provide the modulated light beams to the imaging device 105.

Optical power of light for which an amplitude is modulated by the light modulator 103 is adjusted and is refocused while the light is transmitted through the second lens 110, and then the light reaches the imaging device 105. Thus, the modulated light is concentrated on a region of the imaging device 105 by the second lens 110. The imaging device 105 receives the modulated light for a predetermined exposure period of time and generates an intensity image. For example, as shown in drawing (A) of FIG. 4, the imaging device 105 receives the five reflection light beams 1, which are respectively reflected from each of the five surfaces P1 to P5 of the object 200 and then are modulated, for a predetermined exposure period of time, and the imaging device 105 then generates an intensity image 1. The intensity image 1 may include, for example, an image expressed by black and white (BW). As shown in drawing (B) of FIG. 4, the imaging device 105 receives the five reflection light beams 2, which are respectively reflected from each of the five surfaces P1 to P5 of the object 200 and then are modulated, for a predetermined exposure period of time, and the imaging device 105 then generates an intensity image 2. As these operations are repeated, the imaging device 105 receives the five reflection light beams N, which are respectively reflected from each of the five surfaces P1 to P5 of the object 200 and then are modulated, for a predetermined exposure period of time, and the imaging device 105 then generates an intensity image N, as shown in drawing (C) of FIG. 4. Likewise, as shown in (D) of FIG. 4, N different intensity images may be sequentially obtained. The intensity images 1 to N may each include a sub-frame image for making an image of one frame having depth information. For example, when one frame corresponds to a time interval Td, an exposure period of time for obtaining each of the N intensity images 1 to N in the imaging device 105 may be approximately equal to Td/N.

Figure 4:
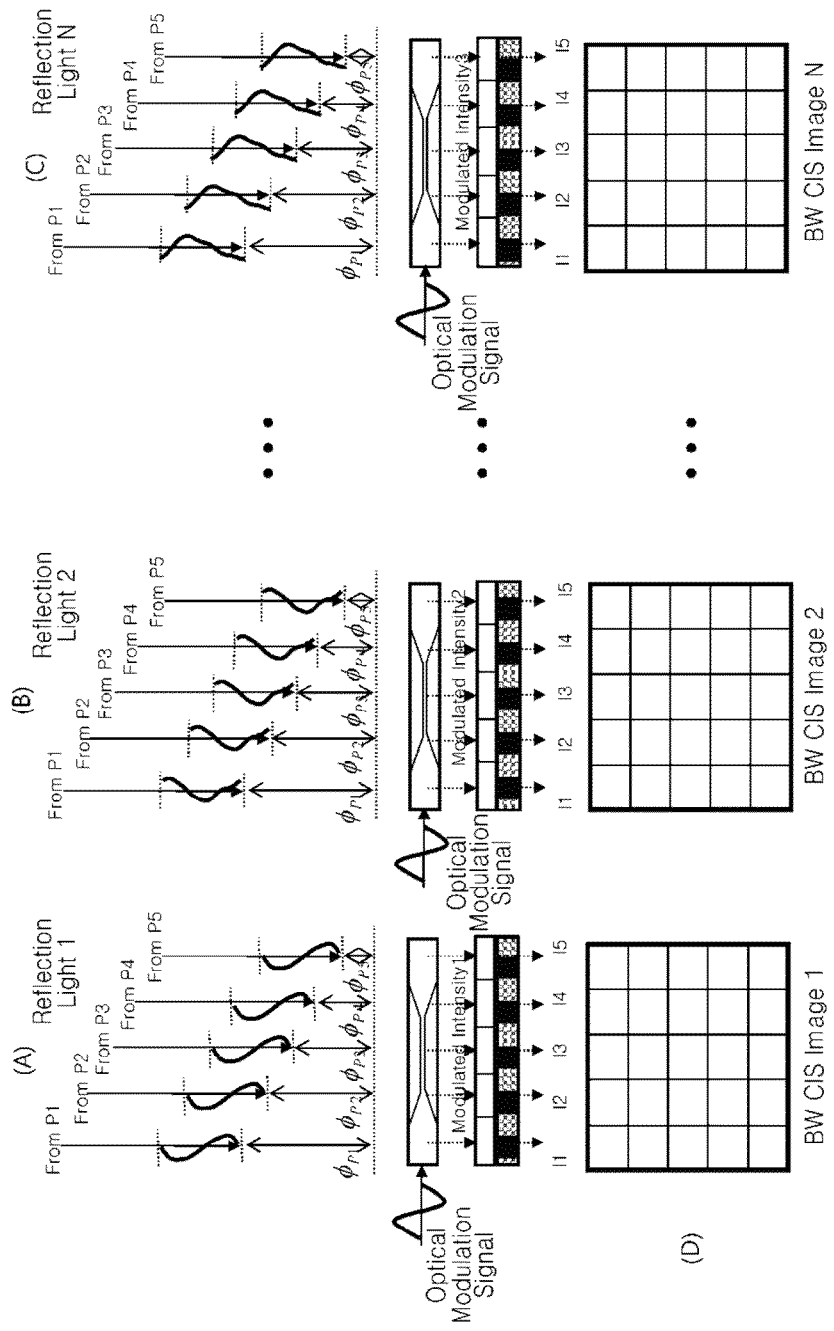
FIG. 4 shows an operation of modulating N different reflection light beams and generating N different images by using an imaging device, according to an exemplary embodiment.

Referring to drawing (A) of FIG. 4, in a first sub-frame, the projection light 1 projected from the light source 101 to the object 200 is reflected from each of the five surfaces P1 to P5 of the object 200 and five reflection light beams 1 are generated. The five reflection light beams 1 are modulated by the light modulator 103 and reach the imaging device 105. For convenience of description, FIG. 4 shows a case in which the imaging device 105 has only five pixels that respectively correspond to the five surfaces P1 to P5. However, the imaging device 105 may have many pixels that are two-dimensionally arranged. In FIG. 4, the five reflection light beams 1 may be incident on the five pixels, respectively. As shown in drawing (A) of FIG. 4, the five reflection light beams 1 that are respectively reflected from each of the surfaces P1 to P5 may respectively have different phase delays $\Phi_{P1}$ to $\Phi_{P5}$ based on respective distances to the surfaces P1 to P5 from the 3D acquisition apparatus 100. The imaging device 105 may photograph the reflection light beams 1 for an exposure period of time of, for example, approximately Td/N, and may generate the intensity image 1. Likewise, each of the intensity image 2 to the intensity image N may be generated by using each of a second sub-frame to an $N_{th}$ sub-frame. As shown in drawing (B) and drawing (C) of FIG. 4, also in each of the second to $N_{th}$ sub-frames, different respective phase delays $\Phi_{P1}$ to $\Phi_{P5}$ are generated from each of the five surfaces P1 to P5 having different depths.

Figure 5:
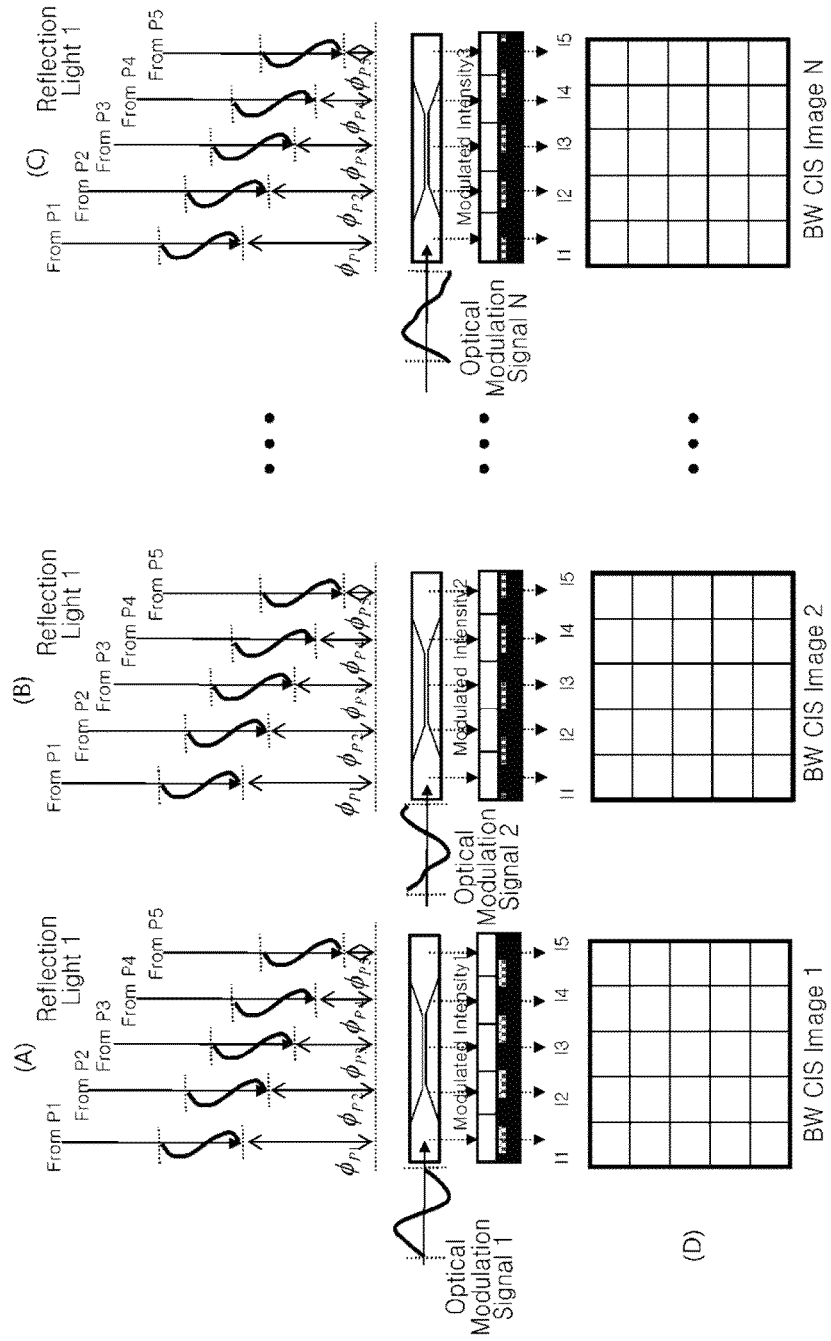
FIG. 5 shows an operation of generating N different images by using a single projection light beam and N different light modulation signals, according to an exemplary embodiment.

FIG. 4 shows a case where N different intensity images are generated by using the N different projection light beams and N different reflective light beams. Alternatively, the same projection light may be used in all sub-frames, and the light modulator 103 may modulate reflection light to have different gain waveforms for respective sub frames. FIG. 5 illustrates a process for generating N different intensity images by using one projection light and N different gain waveforms. Referring to FIG. 5, reflection light reflected from the object 200 has the same waveform and the same phase in all sub-frames. As described above, reflection light of each sub-frame has different respective phase delays $\Phi_{P1}$ to $\Phi_{P5}$ based on the surfaces P1 to P5 of the object 200. As shown in drawing (A), drawing (B), and drawing (C) of FIG. 5, the light modulator 103 modulates reflection light by using a light modulation signal 1 (labeled as "Optical Modulation Signal 1") in a first sub-frame, modulates reflection light by using an light modulation signal 2 (labeled as "Optical Modulation Signal 2") that is different from the light modulation signal 1 in a second sub-frame, and modulates reflection light by using yet another light modulation signal N (labeled as "Optical Modulation Signal N") in an $N_{th}$ sub-frame. In this case, the light modulation signals 1 to N may be completely different signals having different waveforms, or may be signals for which respective periods and respective waveforms are the same, and for which only phases are different. Then, as shown in drawing (D) of FIG. 5, N different intensity images 1 to N may be obtained.

Figure 6:
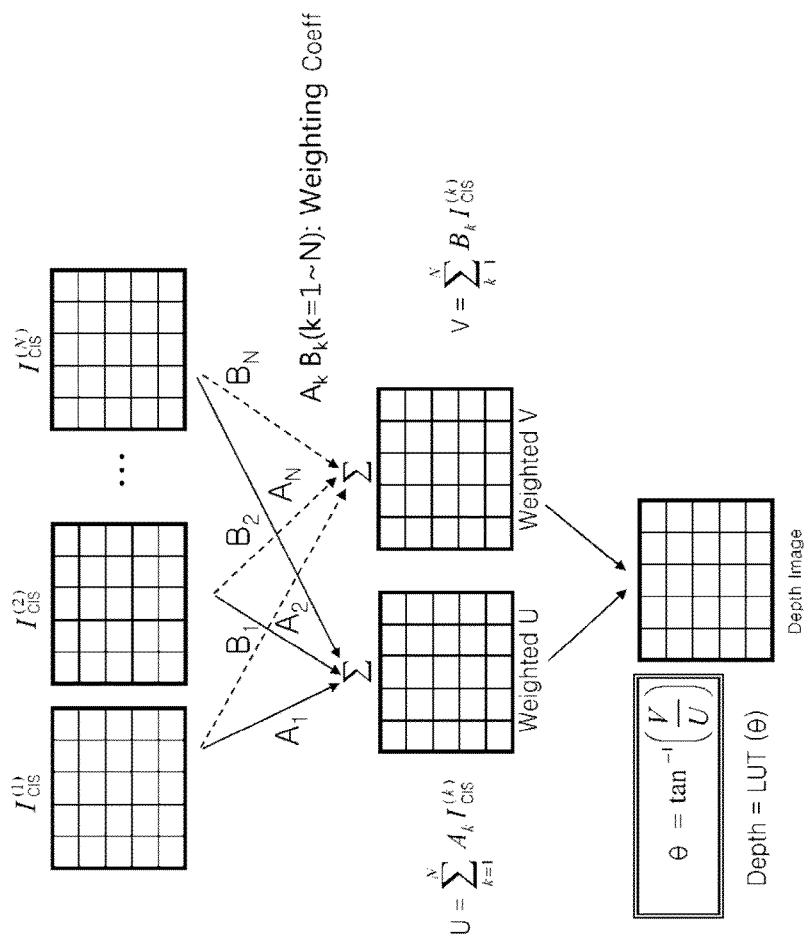
FIG. 6 shows an operation of extracting depth information from N different images, according to an exemplary embodiment.

The N intensity images obtained by the above-described process are transmitted to the depth image processor 107. The depth image processor 107 may extract depth information by using the N intensity images based on an algorithm that will be described below. FIG. 6 illustrates a process for extracting depth information by using the N intensity images. For example, as shown in FIG. 6, a first weighted image U is generated by respectively multiplying each of the N intensity images by respective first weights $A_1$ to $A_N$ and then adding the weighted intensity images. In addition, a second weighted image V that is different from the first weighted image U is generated by respectively multiplying each of the N intensity images by respective second weights $B_1$ to $B_N$ and then adding the weighted intensity images. Then, arctangent $\theta = \tan^{-1}(V/U)$ is calculated with respect to a ratio (V/U) between the second weighted image V and the first weighted image U.

The depth image processor 107 may extract depth information from the obtained θ, with reference to a look-up table that contains information relating to a relationship between θ and an actual depth. According to another exemplary embodiment, depth information may be extracted from a look-up table that contains information relating to a relationship between the actual depth and the ratio between the second weighted image V and the first weighted image U, without obtaining θ. As described below, optimal weights $A_1$ to $A_N$ and $B_1$ to $B_N$ may be calculated in advance and determined based on waveforms of used projection light and light modulation signal and the number N of intensity images. Thus, according to the present exemplary embodiment, depth information from which random noises are removed may be correctly obtained by simple multiplication and addition and with reference to a look-up table only. A method of obtaining weights and an algorithm for generating a look-up table will be described below in more detail.

Figure 7:
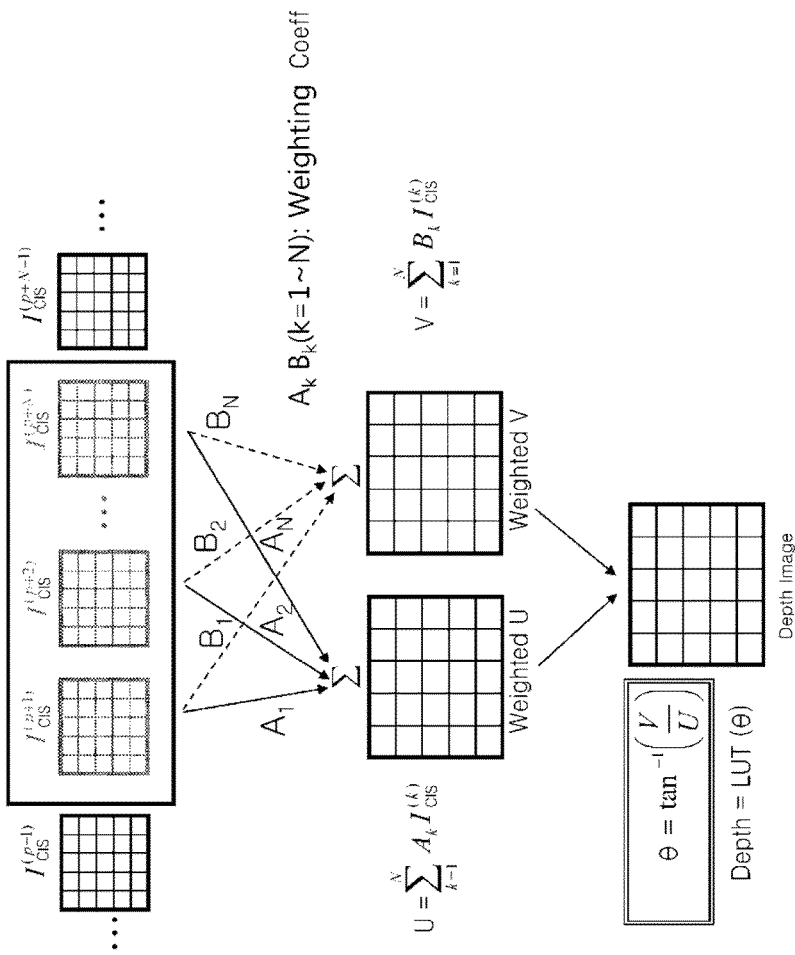
FIG. 7 shows an operation of extracting depth information from N different images, according to another exemplary embodiment.

FIG. 6 illustrates a method which includes obtaining all of N sub-frame images, extracting depth information relating to an image of one frame, obtaining all images of all of N new sub-frame images, and then extracting depth information relating to an image of a next frame. According to another exemplary embodiment, depth information may be updated for each respective sub-frame. For example, referring to FIG. 7, an operation of extracting depth information from N intensity images obtained from N initial sub-frames is the same as in FIG. 6. Then, when an intensity image N+1 is obtained in a $(N+1)_{th}$ sub-frame, the first intensity image 1 may be removed and new depth information may be extracted by applying the above-described weighting method to each of the intensity image 2 to the intensity image N+1. Likewise, when an intensity image N+2 is obtained in a $(N+2)_{th}$ sub-frame, the intensity image 2 may be removed and new depth information may be extracted by applying the method to each of the intensity image 3 through the intensity image N+2. As shown in FIG. 7, new depth information may be extracted for each respective sub-frame while N intensity images are maintained in a memory by using such a first-in-first-out (FIFO) method. FIG. 7 illustrates a case in which a new intensity image is added and simultaneously a previous intensity image is removed. Alternatively, a plurality of new intensity images may be added, and simultaneously, a corresponding number of previous intensity images may be removed. For example, a total of N intensity images may be maintained by adding (N−1) or less new intensity images and removing a same number of the oldest intensity images.

Hereinafter, an algorithm for extracting depth information by using N intensity images via the depth image processor 107 will be described below in detail.

In particular, a depth information extracting algorithm that will be described below includes measuring and analyzing an actual waveform of projection light emitted from the light source 101 and an actual gain waveform of the light modulator 103, representing the results by using a Fourier series, establishing a mathematical model based on the Fourier series, determining, based on the mathematical model, a theoretical relationship between a depth and the first and second weighted images, generating a look-up table, comparing an intensity image obtained from an actual photograph with the look-up table, and extracting depth information in real time.

Hereinafter, a theoretical description will be provided with respect to an exemplary embodiment in which the light source 101 projects N different projection light beams to the object 200 and the light modulator 103 uses one light modulation signal, as shown in FIG. 4. Alternatively, the theoretical description may also be applied to a case in which one projection light beam and N different light modulation signals are used. Although an output of the imaging device 105 may include a two-dimensional array image, because methods for extracting depth information for respective pixels are the same, only a method as applied to a single pixel will be described. However, when depth information is extracted from a plurality of pixels of a two-dimensional array image, the number of calculating operations may be reduced by effectively managing data and effectively assigning a memory to prevent redundant operations.

First, a polynomial may be represented by analyzing a waveform of general projection light with a period $T_{mod}$. For example, according to Equation 1 below, a waveform of projection light may be expressible as a sum of a plurality of high-order sine terms and high-order cosine terms by Fourier analysis, or may be expressible as a general polynomial, such as, for example, a Chebyshev polynomial. Hereinafter, a case in which a waveform of projection light is expressed as a Fourier series will be described.

$$P_e^{(s)}(t) = \sum_{k=1}^{m} \{a_k^{(s)}\sin[k(\omega t - \Phi^{(s)})] + b_k^{(s)}\cos[k(\omega t - \Phi^{(s)})]\} + P_{DC} \quad (1)$$

In Equation 1, s is an identifier for identifying different projection light 1 through projection light N. For example, when N projection light beams are used, s=1, 2, . . . , N. ω is an angular frequency of a waveform of projection light which satisfies ω=2π/$T_{mod}$. $a_k^{(s)}$ is a coefficient of a sine term of a $k_{th}$ harmonic wave of projection light (s), and $b_k^{(s)}$ is a coefficient of a cosine term of a $k_{th}$ harmonic wave of projection light (s). The coefficients $a_k^{(s)}$ and $b_k^{(s)}$ may be obtained by directly measuring optical power of the light source 101. For example, the coefficients $a_k^{(s)}$ and $b_k^{(s)}$ may be obtained by measuring a waveform of projection light emitted from the light source 101 and obtaining frequency components by performing a Fourier transform such as, for example, a fast Fourier transform (FFT) on the measured waveform. In addition, $\Phi^{(s)}$ is a phase of the projection light (s) and $P_{DC}$ is a DC offset that may exist in the projection light. An order m of a highest-order term may be determined to be sufficiently great so as to appropriately represent the measured waveform of projection light output from the light source 101. In an actual process of extracting depth information, because a look-up table that is previously generated may be used, speeds for calculating depth information may be the same regardless of the order m.

For example, with regard to four projection light beams, similarly as illustrated in FIG. 2, $T_{mod}$=50 ns, m=5, $P_{DC}$=0.5 W, and coefficients of respective orders may be expressed as follows.

(a1, a2, a3, a4, a5)=(0.4600, −0.0460, 0.0460, 0.0230, 0.0046)

(b1, b2, b3, b4, b5)=(0.0920, −0.0092, 0.0092, 0.0046, 0.0009)

Any type of waveform represented by Equation 1 above may be used as a waveform of projection light. For example, a sine wave, a sine wave, a triangular wave, a square wave, or a combination thereof, and a wave in which distortion occurs may be used as the waveform of projection light.

A waveform $P_r$ of reflection light that is obtained by reflecting the projection light from the object 200 such that the projection light returns to the 3D acquisition apparatus 100 to have $\Phi_{TOF}$ may be expressed as Equation 2 below.

$$P_r^{(s)}(t) = r\left[\sum_{k=1}^{m}\{a_k^{(s)}\sin[k(\omega t - \Phi^{(s)} - \phi_{TOF})] + b_k^{(s)}\cos[k(\omega t - \Phi^{(s)} - \phi_{TOF})]\} + P_{DC} + P_a\right] \quad (2)$$

In Equation 2, r is reflectivity and $P_a$ is an ambient light component introduced to the 3D acquisition apparatus 100 regardless of the projection light. The reflectivity r is a ratio between light that is reflected from the object 200 and then is incident on the 3D acquisition apparatus 100 and the projection light, and is a parameter which is related to various factors, such as a distance to the object 200, a material and inclination of a surface of the object 200, and the size of the first lens 108. The phase delay $\Phi_{TOF}$ may be determined based on a distance between the object 200 and the 3D acquisition apparatus 100. In Equation 2 above, the reflectivity r, the ambient light component $P_a$, and the phase delay $\Phi_{TOF}$ are unknown values, and the remaining values are already known through measurement.

A general gain waveform of the light modulator 103 may also be expressed as a general polynomial, such as, for example, a Fourier series, similarly as in Equation 3 below. In this case, it is assumed that an angular frequency of the light modulation signal is the angular frequency w that is the same as that of the projection light.

$$G(t) = \sum_{k=1}^{n} \{c_k\sin(k\omega t) + d_k\cos(k\omega t)\} + G_{DC} \quad (3)$$

In Equation 3 above, $c_k$ is a coefficient of a sine term of a $k_{th}$ harmonic wave of a gain waveform and $d_k$ is a coefficient of a cosine term of $k_{th}$ harmonic wave of a gain waveform. The coefficients $c_k$ and $d_k$ may be experimentally obtained by directly measuring a gain waveform of the light modulator 103 and performing Fourier transform, such as an FFT, on the measured gain waveform. In this case, an order n of a highest-order term may be determined to be sufficiently great so as to represent the measured gain waveform, and may be the same as the order m of a highest-order term of the projection light. In addition, $G_{DC}$ is a DC offset that may exist in a gain waveform.

For example, with regard to the gain waveform shown in FIG. 3, $T_{mod}$=50 ns, n=5, $G_{DC}$=0.35 W, and coefficients of respective orders may be expressed as follows.

(c1, c2, c3, c4, c5)=(0.2500, −0.0500, 0.0125, 0.0025, 0.0003)

(d1, d2, d3, d4, d5)=(−0.0500, 0.0100, 0.0025, 0.0005, 0.0003)

A waveform of light that is transmitted through the light modulator 103 and that reaches the imaging device 105 may be obtained by multiplying the reflection light of Equation 2 and the light modulation signal of Equation 3. Thus, an instantaneous waveform $I_{inst}$ of light that reaches the imaging device 105 may be expressed according to Equation 4 below.

$$I_{inst}^{(s)}(t) = P_r^{(s)}(t) \times G(t) = \quad (4)$$

$$r\left[\sum_{k=1}^{m}\{a_k^{(s)}\sin[k(\omega t - \Phi^{(s)} - \phi_{TOF})] + b_k^{(s)}\cos[k(\omega t - \Phi^{(s)} - \phi_{TOF})]\} + P_{DC} + P_a\right] \times \left[\sum_{k=1}^{n}\{c_k\sin(k\omega t) + d_k\cos(k\omega t)\} + G_{DC}\right]$$

The imaging device 105 may receive incident light for a predetermined exposure time T and may generate an intensity image. Thus, the intensity image generated in each pixel of the imaging device 105 may be obtained by integrating the instantaneous waveform of Equation 4. In this case, the predetermined exposure time T may be equal to a period of a sub-frame. For example, when a photograph is performed at a speed of 30 frames per second and N sub-frames exist for each respective frame, the predetermined exposure time T may be approximately equal to 0.033/N second. Based on the sensitivity of the imaging device 105, a predetermined converting ratio between an amount of light that reaches the imaging device 105 and an output of the imaging device 105 may exist. However, for convenience of description, an intensity image $I_{CIS}$ that is an output of the imaging device 105 may be defined according to Equation 5 below.

$$I_{CIS}^{(s)} \equiv \frac{2}{T}\int_0^T I_{inst}^{(s)}(t)\,dt \tag{5}$$

In Equation 5 above, when an intensity image is defined, it is assumed that a scale factor between an intensity of light incident on the imaging device 105 and an output from the imaging device 105 is equal to 1. Thus, it may be required that the scale factor be determined by calibrating the imaging device 105 and that the scale factor be applied to Equation 5 above, when Equation 5 is actually used. However, because an actual value of the scale factor does not adversely affect the generality of the Equations described below, it is assumed that the scale factor is 1 in Equation 5, for convenience of description.

In general, a period of $T_{mod}$ (e.g., 50 ns) of projection light is much smaller than an exposure time (e.g., 0.033/N) of the imaging device 105. Thus, during integration of Equation (5), a DC term of Equation 4 performs an important function. In addition, because a negative number and a positive number are offset by each other in an AC term, the AC term has a relatively small effect on the integration result. Thus, when Equation 4 is inserted into Equation 5 and only a DC term is considered, Equation 6 below may be obtained. A detailed process of deriving Equation 6 is omitted.

$$I_{CIS}^{(s)} = rF^{(s)}(\phi_{TOF}) + rB \tag{6}$$

In Equation 6 above, a first term $F^{(s)}(\Phi_{TOF})$ is a function of a phase delay $\Phi_{TOF}$ that is an unknown value, and a second term $rB$ is a constant term that is an unknown value. $F^{(s)}(\Phi_{TOF})$ and $B$ may be expressed in accordance with Equations 7 and 8 below.

$$F^{(s)}(\phi_{TOF}) = \sum_{k=1}^{l}[(a_k^{(s)}c_k + b_k^{(s)}d_k)\cos(k\Phi^{(s)} + k\phi_{TOF}) + \\ (b_k^{(s)}c_k - a_k^{(s)}d_k)\sin(k\Phi^{(s)} + k\phi_{TOF})] \tag{7}$$

$$B = 2(P_{DC} + P_a)G_{DC} \tag{8}$$

In Equation 7 above, an order l is a smaller value from among an order m and an order n. Thus, as shown in Equations 6, 7, and 8 above, an intensity image $I_{CIS}$ may be defined by a sum of terms related to phase delay that is an unknown value and a constant term that is not related to phase delay.

When depth information is extracted by using N photograph operations, N intensity images $I_{CIS}$ may be obtained, and a problem relating to extracting depth information from the N intensity images $I_{CIS}$ may relate to at least one of the following:

an unknown value that is a solution target: ΦTOF r Pa
known parameters that may be obtained from measurement
$a_k^{(s)}$ $b_k^{(s)}$ $P_{DC}$: which are obtained by measuring optical power
$c_k$ $d_k$ $G_{DC}$: which are obtained by measuring a gain of the light modulator 103
$\Phi^{(s)}$: which is obtained from a phase shift control signal of the light source driver 102
$I_{CIS}^{(1)}$ $I_{CIS}^{(2)}$ $I_{CIS}^{(3)}$ ... $I_{CIS}^{(N)}$: which are measurement results of the imaging device 105

Because of the number of unknown values that are solution targets, at least three independent equations are required. In addition, when the number of independent equations is 4 or more, it is possible to remove random noise. To this end, N (where N≥3) intensity images are sequentially captured, and then a nonlinear simultaneous equation which includes N independent equations relating to a phase delay $\Phi_{TOF}$, such as Equation 9 below, may be obtained by using Equation 6 above.

$$I_{CIS}^{(1)} = rF^{(1)}(\phi_{TOF}) + rB \tag{9}$$
$$I_{CIS}^{(2)} = rF^{(2)}(\phi_{TOF}) + rB$$
$$\vdots$$
$$I_{CIS}^{(N)} = rF^{(N)}(\phi_{TOF}) + rB$$

Equation 9 above may be defined according to Equations 10 and 11 below in order to remove a constant term $rB$.

$$I_{CIS}^{(12)} = rF^{(12)}(\phi_{TOF}) \tag{10}$$
$$I_{CIS}^{(23)} = rF^{(23)}(\phi_{TOF}) \quad \begin{cases} I_{CIS}^{(ij)} = I_{CIS}^{(i)} - I_{CIS}^{(j)} \\ F^{(ij)}(\phi_{TOF}) = F^{(i)}(\phi_{TOF}) - F^{(j)}(\phi_{TOF}) \end{cases}$$
$$\vdots \qquad \vdots$$
$$I_{CIS}^{(N-1,N)} = rF^{(N-1,N)}(\phi_{TOF})$$

$$I_{CIS}^{(ij)} = I_{CIS}^{(i)} - I_{CIS}^{(j)} \tag{11}$$
$$F^{(ij)}(\phi_{TOF}) = F^{(i)}(\phi_{TOF}) - F^{(j)}(\phi_{TOF})$$

In Equations 10 and 11, i, j=1, 2, ..., N and i≠j.

In order to remove 'r', Equation 10 above may be defined according to Equation 12 below by respectively dividing each of the terms on the left sides of the independent equations of Equation 10 above by the terms on the right sides of the respective equations.

$$\frac{I_{CIS}^{(12)}}{F^{(12)}(\phi_{TOF})} = \frac{I_{CIS}^{(23)}}{F^{(23)}(\phi_{TOF})} = \ldots = \frac{I_{CIS}^{(N-1,N)}}{F^{(N-1,N)}(\phi_{TOF})} \tag{12}$$

Because Equation 12 above is a nonlinear function which relates to a phase delay $\Phi_{TOF}$ that is an unknown value, it is possible to directly extract the unknown value from numerical analysis. However, because it takes a long calculating time to extract the unknown value from numerical analysis, it may be difficult to extract depth information in real time via the depth image processor 107. Thus, in order to solve the simultaneous equations of Equation 12, a method for generating a lookup table by using a vector space solution is suggested.

First, a vector which includes (N−1) entries with respect to a multidimensional (e.g., a (N−1) dimensional) space may be defined in accordance with Equations 13 and 14 below.

$$\vec{I}_{CIS} = [I_{CIS}^{(12)}, I_{CIS}^{(23)}, \ldots I_{CIS}^{(N-1,N)}]^T \tag{13}$$

$$\vec{F}(\phi_{TOF}) = [F^{(12)}(\phi_{TOF}), F^{(23)}(\phi_{TOF}), \ldots, F^{(N-1,N)}(\phi_{TOF})]^T \tag{14}$$

As shown in Equation 13 above, a vector $\vec{I}_{CIS}$ (hereinafter, referred to as an "intensity image vector") in a multidimensional space which relates to an intensity image may be generated by using combinations of respective differences between N projection light beams and sizes of related intensity images. Likewise, as shown in Equation 14 above, a phase vector function $\vec{F}(\phi_{TOF})$ in a multidimensional space which relates to a phase delay may be generated by using combinations of respective differences between N projection light beams and phase functions related to phase delays.

Equation 12 above may be expressible as Equation 15 below by using vectors of Equations 13 and 14 above.

$$\vec{I}_{CIS} // \vec{F}(\phi_{TOF}) \qquad (15)$$

In particular, a condition under which an intensity image vector $\vec{I}_{CIS}$ and a theoretical vector function $\vec{F}(\phi_{TOF})$ are parallel is a solution. In this case, an intensity image vector $\vec{I}_{CIS}$ is a vector that is determined from measurement, and a phase vector function $\vec{F}(\phi_{TOF})$ is a theoretical function related to a phase delay that is mathematically determinable by using Equations 7, 11, and 14. Thus, when a direction of a theoretical phase vector function $\vec{F}(\phi_{TOF})$ is calculated in advance with respect to a phase delay $\Phi_{TOF}$, a phase delay $\Phi_{TOF}$ may be easily obtained from a direction of the phase vector function $\vec{F}(\phi_{TOF})$ that is parallel to a direction of the intensity image vector $\vec{I}_{CIS}$ that is determined from measurement.

To this end, in order to define a direction of a vector, two orthogonal normal vectors may be defined according to Equations 16 and 17 below, respectively.

$$\hat{x} = \vec{F}(0°)/\|\vec{F}(0°)\| = [x_1 x_2 \ldots x_{N-1}]^T \qquad (16)$$

In Equation 16, $\vec{F}(0°) = [F^{(12)}(0°), F^{(23)}(0°), \ldots, F^{(N-1,N)}(0°)]^T$.

$$\hat{y} = \vec{Y}/\|\vec{Y}\| = [y_1 y_2 \ldots y_{N-1}]^T \qquad (17)$$

In Equation 17, $\vec{Y} = \vec{F}(90°) - [\vec{F}(90°)^T \hat{x}]\hat{x}$. In particular, an orthogonal normal vector $\hat{x}$ corresponds to a direction of a phase vector function $\vec{F}(\phi_{TOF})$ when a phase delay corresponds to zero degrees. In addition, an orthogonal normal vector $\hat{y}$ corresponds to a direction of a phase vector function $\vec{F}(\phi_{TOF})$ when a phase delay corresponds to 90 degrees. Thus, the two orthogonal normal vectors have properties as shown in Equation 18 below.

$$\hat{x}^T \hat{y} = 0, \|\hat{x}\| = \|\hat{y}\| = 1 \qquad (18)$$

In Equation 18, an upper index T indicates a transformation of a matrix (for example, a N×M matrix is transformed into a M×N matrix).

Thus, a direction of a theoretical phase vector function $\vec{F}(\phi_{TOF})$ due to a phase delay $\Phi_{TOF}$ may be expressed as an angle $\theta_{analy}$ with respect to an orthogonal normal vector $\hat{x}$ according to Equation 19 below.

$$\theta_{analy}(\phi_{TOF}) = \tan^{-1}\left(\frac{V(\phi_{TOF})}{U(\phi_{TOF})}\right) \qquad (19)$$

In Equation 19, a function $U(\Phi_{TOF})$ corresponds to a $\hat{x}$ direction component of a phase vector function $\vec{F}(\phi_{TOF})$ and a function $V(\Phi_{TOF})$ corresponds to a $\hat{y}$ direction component of a phase vector function $\vec{F}(\phi_{TOF})$. The functions $U(\Phi_{TOF})$ and $V(\Phi_{TOF})$ may be represented by Equations 20 and 21 below.

$$U(\phi_{TOF}) = \hat{x}^T \vec{F}(\phi_{TOF}) \qquad (20)$$

$$V(\phi_{TOF}) = \hat{y}^T \vec{F}(\phi_{TOF}) \qquad (21)$$

Figure 8:
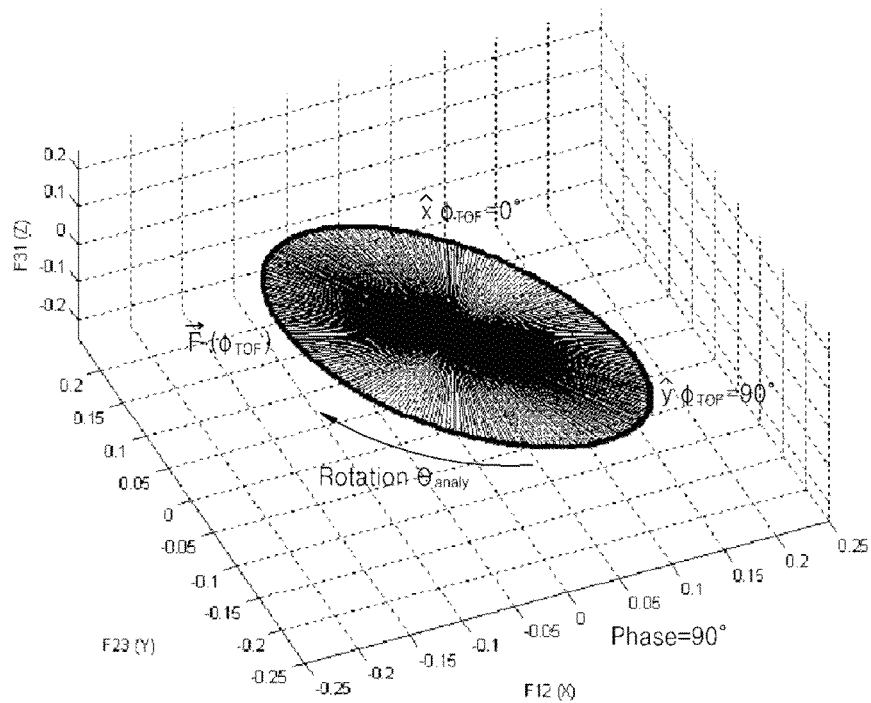
FIG. 8 shows an example of a theoretical vector function which relates to a phase delay which is indicated on a 3D space when four projection light beams are used.

For example, when four projection light beams are used (N=4), a theoretical phase vector function which corresponds to a phase delay may be represented in a three-dimensional space, as shown in FIG. 8.

Thus, a relationship between an angle $\theta_{analy}$ and a phase delay $\Phi_{TOF}$ may be used to generate a look-up table $\Phi_{TOF} = \text{LUT}(\theta_{analy})$ by performing numerical analysis on Equations 19, 20, and 21 above. For example, a look-up table having 1000 data points may be represented as follows.

$$LUT = \begin{bmatrix} \theta_1 & \phi_{TOF1} \\ \theta_2 & \phi_{TOF2} \\ \vdots & \vdots \\ \theta_{1000} & \phi_{TOF1000} \end{bmatrix}$$

A distance, that is, a depth "d" between the object 200 and the 3D acquisition apparatus 100, may be expressed as follows by using a relationship with respect to a phase delay $\Phi_{TOF}$.

$$d = \frac{c\phi_{TOF} T_{mod}}{4\pi} \qquad (22)$$

In this case, c is a velocity of light. Thus, a relationship between the depth d and the angle $\theta_{analy}$ instead of a phase delay may be used to generate a look-up table in accordance with the expression $d = \text{LUT}(\theta_{analy})$ by using Equation 22 above. For example, the relationship between the depth d and the angle $\theta_{analy}$ may be represented by a look-up table having 1000 data points as follows.

$$LUT = \begin{bmatrix} \theta_1 & d_1 \\ \theta_2 & d_2 \\ \vdots & \vdots \\ \theta_{1000} & d_{1000} \end{bmatrix}$$

In addition, it is possible to generate a look-up table in accordance with the expression $d = \text{LUT}(V/U)$ by using a ratio between $U(\Phi_{TOF})$ and $V(\Phi_{TOF})$ instead of using the arctangent of this ratio, as shown in Equation 19 above. For example, a relationship between the depth d and the ratio V/U may be represented by a look-up table having 1000 data points as follows.

$$LUT' = \begin{bmatrix} (V/U)_1 & d_1 \\ (V/U)_2 & d_2 \\ \vdots & \vdots \\ (V/U)_{1000} & d_{1000} \end{bmatrix}$$

Likewise, by numerically analyzing the theoretical phase vector function $\vec{F}(\phi_{TOF})$ based on a phase delay, the phase vector function $\vec{F}(\phi_{TOF})$ may be used to generate a look-up table which includes information relating to a relationship between the phase delay $\Phi_{TOF}$ or the depth d and the angle $\theta_{analy}$ with respect to the orthogonal normal vector $\hat{x}$ or a component ratio V/U of two orthogonal normal vector directions of the phase vector function $\vec{F}(\phi_{TOF})$.

As shown in Equation 15 above, because the intensity image vector $\vec{I}_{CIS}$ and the theoretical phase vector function $\vec{F}(\phi_{TOF})$ based on a phase delay are parallel, an angle $\theta_{CIS}$ of the intensity image vector $\vec{I}_{CIS}$ with respect to the orthogonal normal vector $\hat{x}$ is $\theta_{analy}$. Thus, when the angle $\theta_{CIS}$ of the intensity image vector $\vec{I}_{CIS}$ is with respect to the orthogonal normal vector $\hat{x}$, which is actually measured, is applied to the above-described look-up table, or a component ratio of the two orthogonal normal vector directions of the intensity image vector is applied to the look-up table, final depth information may be extracted. Because the look-up table has previously been generated by using numerical analysis, the depth image processor 107 of the 3D acquisition apparatus 100 may simply calculate the angle $\theta_{CIS}$ of the intensity image vector $\vec{I}_{CIS}$ with respect to the orthogonal normal vector $\hat{x}$ or a component ratio of the intensity image vector $\vec{I}_{CIS}$ to the two orthogonal normal vector directions, and then may search the look-up table.

Figure 9:
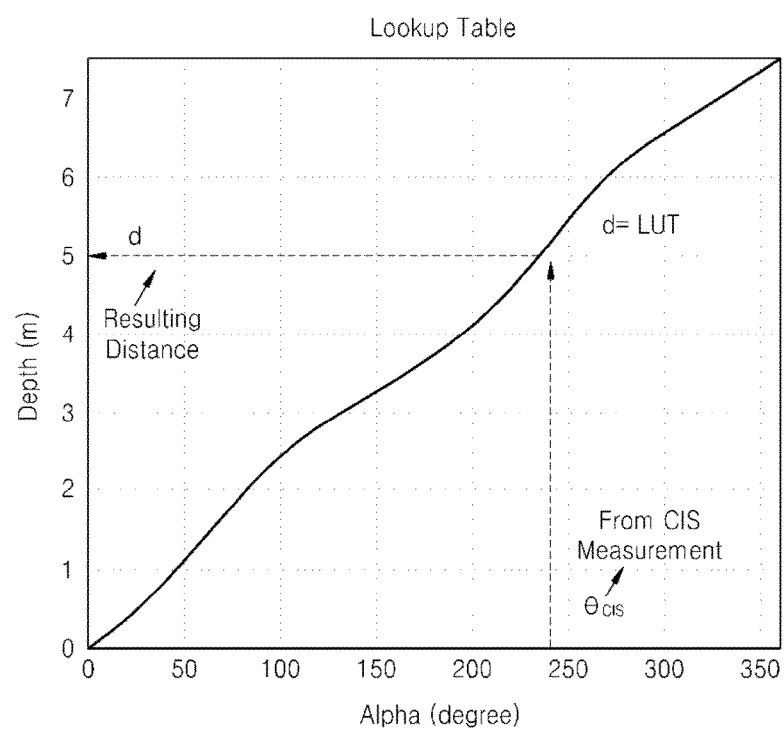
FIG. 9 is a graph which illustrates an example of a look-up table representing a relationship between an angle of a vector function and depth.

For example, when the four projection light beams shown in FIG. 2 and the gain waveform shown in FIG. 3 are used, a look-up table which includes information relating to a relationship between the angle $\theta_{analy}$ and the depth d of a phase vector function may be indicated by a graph shown in FIG. 9. In FIG. 9, when the angle $\theta_{CIS}$ of the intensity image vector $\vec{I}_{CIS}$ with respect to the orthogonal normal vector $\hat{x}$ is approximately equal to 250 degrees, the depth image processor 107 may obtain a result that the depth d is equal to 5 m by searching the look-up table as illustrated in FIG. 9.

Similar as the angle $\theta_{analy}$ represented by Equation 19 above, an angle $\theta_{CIS}$ of the intensity image vector $\vec{I}_{CIS}$ may be determined by using Equation 23 below.

$$\theta_{CIS} = \tan^{-1}\left(\frac{\hat{y}^T \vec{I}_{CIS}}{\hat{x}^T \vec{I}_{CIS}}\right) \quad (23)$$

In Equation 23 above, a direction component of the orthogonal normal vector $\hat{x}$ of the intensity image vector $\vec{I}_{CIS}$ may be expanded according to Equation 24 below.

$$\begin{aligned}\hat{x}^T \vec{I}_{CIS} &= x_1 I_{CIS}^{(12)} + x_2 I_{CIS}^{(23)} + \ldots + x_{N-1} I_{CIS}^{(N-1,N)} = U \quad (24)\\ &= x_1 I_{CIS}^{(1)} - x_1 I_{CIS}^{(2)} + x_2 I_{CIS}^{(2)} - x_2 I_{CIS}^{(3)} + \ldots + x_{N-1} I_{CIS}^{(N-1)} - x_{N-1} I_{CIS}^{(N)}\\ &= x_1 I_{CIS}^{(1)} + (x_2 - x_1) I_{CIS}^{(2)} + (x_3 - x_2) I_{CIS}^{(3)} + \ldots + (x_{N-1} - x_{N-2}) I_{CIS}^{(N-1)} - x_{N-1} I_{CIS}^{(N)}\end{aligned}$$

From Equation 24 above, a direction component of the orthogonal normal vector $\hat{x}$ of the intensity image vector $\vec{I}_{CIS}$ may be defined according to Equation 25 below.

$$U = \sum_{k=1}^{N} A_k I_{CIS}^{(k)} \quad (25)$$

where

-continued $$\begin{cases} A_1 = x_1 \\ A_k = x_k - x_{k-1} & \text{for } k = 2 \sim N-1 \\ A_N = -x_{N-1} \end{cases}$$

Thus, the direction component of the orthogonal normal vector $\hat{x}$ of the intensity image vector $\vec{I}_{CIS}$ may be a first weighted image U which is obtainable by respectively multiplying each of N intensity images by corresponding weights $A_1$ to $A_N$ and then adding the weighted intensity images. In this case, the weights $A_1$ to $A_N$ may be derived from (N−1) components of the orthogonal normal vector $\hat{x}$ defined according to Equation 16 above, as shown in Equation 25. Detailed values corresponding to the (N−1) components of the orthogonal normal vector $\hat{x}$ may be obtained from values of a phase vector function $\vec{F}(\phi_{TOF})$. For example, $x_1$ through $x_{N-1}$ may be calculated according to $[x_1\ x_2 \ldots x_{N-1}]^T = [F^{(12)}(0°), F^{(23)}(0°), F^{(34)}(0°)]^T / \|\vec{F}(0°)\|$.

Similarly, a direction component of the orthogonal normal vector $\hat{y}$ of the intensity image vector may be defined according to Equation 26 below.

$$V = \sum_{k=1}^{N} B_k I_{CIS}^{(k)} \quad (26)$$

where $$\begin{cases} B_1 = y_1 \\ B_k = y_k - y_{k-1} & \text{for } k = 2 \sim N-1 \\ B_N = -y_{N-1} \end{cases}$$

Thus, the direction component of the orthogonal normal vector $\hat{y}$ of the intensity image vector $\vec{I}_{CIS}$ may be a second weighted image V which is obtainable by respectively multiplying each of the above-described N intensity images by corresponding weights $B_1$ to $B_N$ and then adding the weighted intensity images. In this case, the weights $B_1$ to $B_N$ may be derived from (N−1) components of orthogonal normal vector $\hat{y}$ defined according to Equation 17. The weights $A_1$ to $A_N$ and the weights $B_1$ to $B_N$ may also be calculated and may be stored in a memory of the 3D acquisition apparatus 100.

As a result, the angle $\theta_{CIS}$ of the intensity image vector $\vec{I}_{CIS}$ may be determined by using Equation 27 below.

$$\theta_{CIS} = \tan^{-1}\left(\frac{V}{U}\right) \quad (27)$$

As described above, U corresponds to a $\hat{x}$ direction component of the intensity image vector $\vec{I}_{CIS}$ and V corresponds to a $\hat{y}$ direction component of the intensity image vector $\vec{I}_{CIS}$. Unlike the functions $U(\Phi_{TOF})$ and $V(\Phi_{TOF})$ of Equation 19 that expresses a function which relates a phase delay, U and V of Equation 27 above are values obtained by measurement. The depth d may be obtained by applying the angle $\theta_{CIS}$ to a look-up table that has previously been generated and that includes information relating to a relationship between the depth d and the angle $\theta_{analy}$. Alternatively, the depth d may be obtained from a look-up table that has previously been generated and that includes information relating to a relationship between the depth d and the ratio V/U, instead of using the arctangent of the ratio V/U.

As described above, when look-up tables which include information relating to a relationship between the depth d and the angle $\theta_{analy}$ that are calculated in advance or which include information relating to a relationship between the depth d and the angle $\theta_{analy}$, and the weights $A_1$ to $A_N$ and $B_1$ to $B_N$ that are calculated in advance are stored in a memory of the 3D acquisition apparatus 100, the depth image processor 107 can extract depth information without being required to perform complex calculations. In order to accomplish this reduction in complexity, it is necessary only to simply multiply intensity images received from the imaging device 105 by corresponding weights and to add the weighted intensity images. Thus, depth information may be rapidly extracted in real time. In particular, the number of calculating operations does not significantly increase even when four or more projection light beams (i.e., N≥4) are used to remove random noises. Thus, a mean phase delay from which random noises are removed may be simply and rapidly obtained. In addition, because a required amount of a memory is significantly reduced, the corresponding size and the corresponding manufacturing costs of the 3D acquisition apparatus 100 may be reduced. In addition, because distance information is extracted in consideration of an actual nonlinear waveform instead of a mathematically ideal waveform, correct distance information may be extracted without being adversely affected by a type of waveform being used.

The look-up table, the weights $A_1$ to $A_N$, and the weights $B_1$ to $B_N$ may be determined based on a waveform of projection light emitted from the light source 101 or based on a gain waveform of the light modulator 103. Thus, when the 3D acquisition apparatus 100 selectively uses a plurality of combinations of a plurality of different projection light beams and a plurality of different gain waveforms, the look-up table which includes information relating to the combinations and the weights $A_1$ to $A_N$ and $B_1$ to $B_N$ may be calculated in advance and may be stored in the memory of the 3D acquisition apparatus 100. Thus, in order to extract depth information, the look-up table which corresponds to the selected combination and the weights $A_1$ to $A_N$ and the weights $B_1$ to $B_N$ may be used. In this case, the memory may be disposed in the controller 106 or the depth image processor 107, or may be embodied as a separate moveable storage medium that is separate from the controller 106 and the depth image processor 107.

Figure 10:
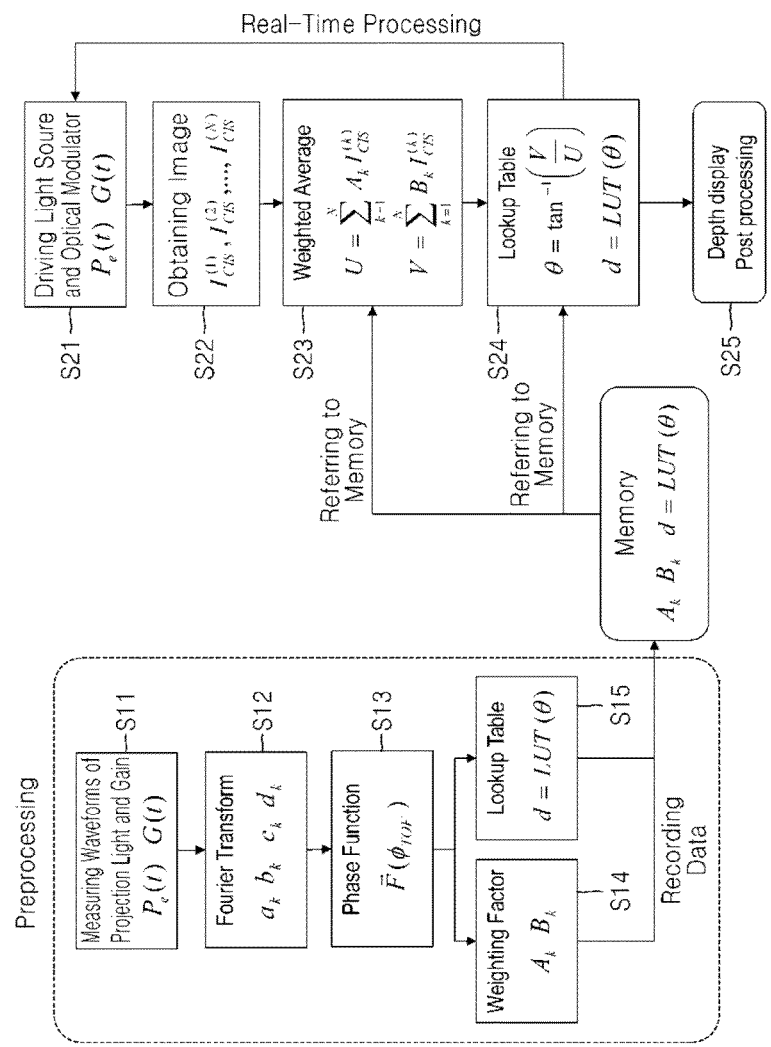
FIG. 10 is a flowchart which illustrates a method for extracting depth information, according to an exemplary embodiment.

FIG. 10 is a flowchart which illustrates a method for extracting depth information, which method has been described above. Referring to FIG. 10, the method according to the present exemplary embodiment includes a preprocessing operation for previously calculating and storing weights and a look-up table, and a real time processing operation for capturing at least one intensity image and extracting depth information by using the calculated weights and the look-up table.

With regard to the preprocessing operation as illustrated in a left side portion of FIG. 10, in operation S11, an actual waveform of projection light which is emitted from the light source 101 and an actual gain waveform of the light modulator 103 are measured. For example, the light source driver 102 may control the light source 101 to emit a plurality of projection light beams having a particular waveform with a period $T_{mod}$. The projection light may have a waveform of at least one of a sine wave, a triangular wave, a rectangular wave, a square wave, a combination thereof, or a waveform having a general shape. The plurality of projection light beams may have different waveforms or may have the same waveform, and may also have different phases. However, periods of the plurality of projection light beams may be the same. In addition, the light modulator driver 104 may control the light modulator 103 to modulate light with by using light modulation signal having a particular waveform with a period $T_{mod}$. As shown in FIG. 5, when light modulation signals having different waveforms are used for a single type of projection light beam, the waveforms of the plurality of light modulation signals may be measured. The waveform of the light modulation signal may have a waveform of at least one of a sine wave, a triangular wave, a rectangular wave, a square wave, a combination thereof, or a waveform having a general shape.

Then, in operation S12, Fourier analysis is performed on the plurality of projection light beams and the light modulation signals that are measured in operation S11 so as to determine a coefficient of a sine term, a coefficient of a cosine term, and a DC offset as expressed in Equations 1 and 3 that are related to each of the projection light beams and each of the light modulation signals. For example, a coefficient $a_k^{(s)}$ of a sine term of a $k_{th}$ harmonic wave of the projection light, a coefficient $b_k^{(s)}$ of a cosine term of a $k_{th}$ harmonic wave of the projection light, a phase $\Phi^{(s)}$ of projection light, and a DC offset value $P_{DC}$ that may exist in the projection light may be determined. Likewise, a coefficient $c_k$ of a sine term of a $k_{th}$ harmonic wave of an light modulation signal, a coefficient $d_k$ of a cosine term of a $k_{th}$ harmonic wave and a DC offset value $G_{DC}$ may be determined. Although not shown in Equation 3, when a plurality of light modulation signals having different phases are used, the phases of the light modulation signals may be determined.

Then, in operation S13, numerical analysis is performed on a phase vector function $\vec{F}(\phi_{TOF})$ with respect to a multidimensional space which function relates to phase delays as defined in Equations 7 and 14. Then, in operation S14, weights $A_k$ and $B_k$ may be calculated from the numerical analysis result and may be stored, and in operation S15, a look-up table may be generated and may be stored in a memory. For example, the look-up table may be generated by obtaining $U(\Phi_{TOF})$ that is a $\hat{x}$ direction component of the phase vector function $\vec{F}(\phi_{TOF})$ and $V(\Phi_{TOF})$ that is a $\hat{y}$ direction component of the phase vector function $\vec{F}(\phi_{TOF})$ and then determining a relationship between the phase delay $\Phi_{TOF}$ and an angle $\theta_{analy}$ of the phase vector function $\vec{F}(\phi_{TOF})$ by using Equation 19 above. Alternatively, the look-up table may be generated by determining a relationship between the depth d and the angle $\theta_{analy}$ of the phase vector function $\vec{F}(\phi_{TOF})$ by using Equation 22. Alternatively, the look-up table may be generated by determining a relationship between the depth d and a ratio (V/U) of the functions $U(\Phi_{TOF})$ and $V(\Phi_{TOF})$. Weights $A_k$ and $B_k$ may be calculated by using Equations 16, 17, 25, and 26.

The look-up table that is generated by using the above-described methods and the weights may be determined based on the used projection light and combinations of light modulation signals. Thus, if a phase or a waveform of any one of a plurality of projection light beams and a plurality of light modulation signals is changed, a new look-up table and weights may be correspondingly generated. For example, look-up tables and weights may be generated for respective combinations of projection light beams and light modulation signals that are used in the 3D acquisition apparatus 100. Then, during an operation of the 3D acquisition apparatus 100, it is possible to refer to a respective look-up table based on a corresponding combination of the used projection light and light modulation signal. Various combinations of the projection light beams and the light modulation signals may include a combination of four or more projection light beams and a single light modulation signal, and a combination of a single projection light beam and three or more light modulation, as well as combinations of three projection light beams and a single light modulation signal. In all cases, the above-described method for generating a look-up table and a weight may be used. For example, the look-up tables and the weights may be stored in a memory of the 3D acquisition apparatus 100 or a separate moveable storage medium that is not shown.

With regard to the real time processing operation as illustrated in a right side portion of FIG. 10, in operation S21, the light source 101 may sequentially generate N (N≥3) different projection light beams and may project the N projection light beams toward the object 200. As described above, N or more projection light beams may have the same period $T_{mod}$ and different phases, or alternatively, may have different waveforms. The projection light may include a near infrared ray having a wavelength, for example, which is approximately equal to 850 nm.

Then, the N projection light beams are reflected from the object 200 such that the projection light beams may sequentially return to the 3D acquisition apparatus 100. In this case, only a near infrared ray having a wavelength of, for example, approximately 850 nm is transmitted from among reflection light beams by using the filter 109. Then, the light modulator 103 modulates N reflection light beams which have reflected from the object 200 and provides the modulated light to the imaging device 105. The light modulation signal of the light modulator 103 may have any waveform but may have the same period as a period $T_{mod}$ of projection light. According to another exemplary embodiment, reflection light may be modulated by using N light modulation signals instead of using only a single projection light beam.

Then, in operation S22, the imaging device 105 photographs reflection light modulated by the light modulator 103 for an exposure period of time and outputs the photographed reflection light as an intensity image. Thus, N intensity images that respectively correspond to the N projection light beams may be obtained. The N intensity image beams may be provided to the depth image processor 107.

In operation S23, the depth image processor 107 reads the weights $A_k$ and $B_k$ that are stored in a memory. In this case, the weights $A_k$ and $B_k$ may be determined based on a combination of a particular projection light beam and an light modulation signal, and the depth image processor 107 may search for and read a weight corresponding to a combination of projection light and a light modulation signal that are currently being used by the 3D acquisition apparatus 100. In addition, the depth image processor 107 calculates a $\hat{x}$ direction component U and a $\hat{y}$ direction component V of an intensity image vector $\vec{T}_{CIS}$ by using the weight and obtains a ratio V/U. For example, a first weighted image U that is the $\hat{x}$ direction component is obtained by respectively multiplying each of N intensity images by respective weights $A_1$ to $A_N$ and then adding the weighted intensity images. In addition, a second weighted image V that is the $\hat{y}$ direction component that is different from the $\hat{x}$ direction component is obtained by respectively multiplying each of the N intensity images by respective weights $B_1$ to $B_N$ and then adding the weighted intensity images. Thus, a ratio V/U of the two weighted images may be calculated.

When the ratio (V/U) of the two weighted images is obtained, the depth image processor 107 may obtain the depth d by using the look-up table, in operation S24. Because the look-up table may also be changed based on which combination of projection light and light modulation signal is currently being used, the depth image processor 107 may search and read the look-up table which corresponds to a combination of projection light and light modulation signal that are currently being used by the 3D acquisition apparatus 100. If the look-up table generated in operation S15 includes information relating to a relationship between a phase delay $\Phi_{TOF}$ and an angle $\theta_{analy}$, the depth image processor 107 may calculate an arctangent $\theta = \tan^{-1}$ (V/U) of a ratio V/U of the first weighted image U and the second weighted image V, may calculate a phase delay based on the arctangent by using a look-up table, and may calculate the depth d from the phase delay. If the look-up table generated in operation S15 includes information relating to a relationship between the depth d and the angle $\theta_{analy}$, the depth image processor 107 may calculate the arctangent $\theta = \tan^{-1}$(V/U) of a ratio V/U of the first weighted image U and the second weighted image V and may calculate the depth d based on the arctangent by using the look-up table. If the look-up table generated in operation S15 includes information relating to a relationship between a ratio between functions $U(\Phi_{TOF})$ and $V(\Phi_{TOF})$ and the depth d, the depth d may be directly calculated based on the ratio V/U between the first weighted image U and the second weighted image V by using the look-up table.

Lastly, in operation S25, an appropriate postprocessing process is performed on depth information relating to the object 200, which is extracted by using the above-described method, in order to display a three-dimensional image. For example, the depth image processor 107 may generate a three-dimensional image by extracting depth information for each respective pixel of a plurality of pixels of the imaging device 105 and adding the extracted depth information to a general color image that is captured by an image device that is not shown.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

What is claimed is:

1. A method for extracting depth information, the method comprising:
   sequentially projecting a natural number N respective projection light beams toward an object;
   modulating N reflection light beams which are correspondingly reflected from the object by using a light modulation signal;
   generating N images by photographing the N reflection light beams;
   generating a first weighted image U by performing a first multiplying operation which includes multiplying each respective one of the N generated images by respective first weights and adding the weighted images resulting from the first multiplying operation, and generating a second weighted image V by performing a second multiplying operation which includes multiplying each respective one of the N generated images by respective second weights that are respectively different from the corresponding first weights and adding the weighted images resulting from the second multiplying operation; and
   calculating a distance relating to the object based on a ratio between the first weighted image U and the second weighted image V by using a look-up table that includes measurement information relating to the N respective projection light beams and the light modulation signal, wherein the look-up table comprises at least one of:
a first look-up table which includes information relating to a relationship between a phase delay and an arctangent of the ratio between the first weighted image U and the second weighted image V;
a second look-up table which includes information relating to a relationship between the distance relating to the object and the arctangent of the ratio between the first weighted image U and the second weighted image V; and
a third look-up table which includes information relating to a relationship between the distance relating to the object and the ratio between the first weighted image U and the second weighted image V.

2. The method of claim 1, wherein the N respective projection light beams comprise periodic waves having a same period, wherein at least one of waveforms, amplitudes, and phases of the N respective projection light beams vary between respective ones of the N respective projection light beams.

3. The method of claim 2, wherein the light modulation signal has the same period as the N respective projection light beams.

4. The method of claim 1, wherein each of the N respective projection light beams and the light modulation signal has at least one of a sine wave, a triangular wave, a rectangular wave, a square wave, and a general waveform which is obtainable by combining at least two of a sine wave, a triangular wave, a rectangular wave, and a square wave, and which are expressible as a sum of a plurality of high-order sine terms and high-order cosine terms.

5. The method of claim 1, wherein the first weighted image U is generated by using the respective first weights $A_1$ to $A_N$ that respectively correspond to the N images, and the second weighted image V is generated by using the respective second weights $B_1$ to $B_N$ that respectively correspond to the N images.

6. The method of claim 5, wherein the respective first weights and the respective second weights are calculated based on measurements relating to the N respective projection light beams and the light modulation signal.

7. The method of claim 1, wherein each of a plurality of look-up tables corresponds to a respective one of a plurality of possible combinations of the N respective projection light beams and the light modulation signal, and
wherein the calculating the distance relating to the object is performed by using a respective one of the plurality of look-up tables which corresponds to a combination of the N respective projection light beams and the light modulation signal which has been used.

8. The method of claim 1, further comprising:
generating at least one new image by projecting at least one respective projection light beam toward the object, wherein the at least one new image comprises a number of new images which is not greater than (N-1);
removing one of the N images that were originally generated for each of the generated at least one new image;
generating new respective first weighted images and new respective second weighted images by respectively multiplying each respective one of the remaining N images by each of the respective first weights and by each of the respective second weights;
calculating a new ratio between the new respective first weighted images and the new respective second weighted images; and
calculating a new distance which relates to the object, based on the calculated new ratio, by using the look-up table.

9. A three-dimensional (3D) acquisition apparatus comprising:
a light source which projects projection light toward an object;
a light modulator which modulates reflection light that is reflected from the object by using a light modulation signal;
an imaging device which generates an image by photographing light that is modulated by the light modulator; and
a depth information image processor which calculates a distance relating to the object by using the image generated by the imaging device,
wherein the depth information image processor extracts depth information by using the method of claim 1.

10. The 3D acquisition apparatus of claim 9, further comprising:
a light source driver which drives the light source to control a waveform of projection light;
a light modulator driver which drives the light modulator to control a gain waveform of the light modulation signal; and
a controller which controls operations of the light source driver, the light modulator driver, and the imaging device.

11. The 3D acquisition apparatus of claim 9, wherein the imaging device uses a charge-doubled device (CCD) image sensor, a complementary metal-oxide semiconductor (CMOS), and at least one of a single photodiode and a photo diode array, which array includes at least one of a one-dimensional array and a two-dimensional array, for measuring a distance relating to a single point.

12. The 3D acquisition apparatus of claim 9, further comprising a memory which stores the look-up table, and which stores the respective first weights and the respective second weights that are calculated based on measurements relating to the projection light and the light modulation signal.

13. A method for extracting depth information, the method comprising:
sequentially projecting a natural number N identical projection light beams toward an object;
modulating N reflection light beams which are correspondingly reflected from the object by using N respective light modulation signals;
generating N images by photographing the N reflection light beams;
generating a first weighted image U by performing a first multiplying operation which includes multiplying each respective one of the N generated images by respective first weights and adding the weighted images resulting from the first multiplying operation, and generating a second weighted image V by performing a second multiplying operation which includes multiplying each respective one of the N generated images by respective second weights that are respectively different from the corresponding first weights and adding the weighted images resulting from the second multiplying operation; and
calculating a distance relating to the object based on a ratio between the first weighted image U and the second weighted image V by using a look-up table that includes measurement information relating to the N respective light modulation signals and one of the N identical projection light beams, wherein the look-up table comprises at least one of:
a first look-up table which includes information relating to a relationship between a phase delay and an arctangent of the ratio between the first weighted image U and the second weighted image V;
a second look-up table which includes information relating to a relationship between the distance relating to the object and the arctangent of the ratio between the first weighted image U and the second weighted image V; and
a third look-up table which includes information relating to a relationship between the distance relating to the object and the ratio between the first weighted image U and the second weighted image V.

14. The method of claim 13, wherein each of a plurality of look-up tables corresponds to a respective one of a plurality of possible combinations of the one identical projection light beam and the N respective light modulation signals, and
wherein the calculating the distance relating to the object is performed by using a respective one of the plurality of look-up tables which corresponds to a combination of the one identical projection light beam and the N respective light modulation signals which has been used.

15. A 3D acquisition apparatus comprising:
a light source which projects projection light toward an object;
a light modulator which modulates reflection light that is reflected from the object by using an light modulation signal;
an imaging device which generates an image by photographing light that is modulated by the light modulator; and
a depth information image processor which calculates a distance relating to the object by using the image generated by the imaging device,
wherein the depth information image processor extracts depth information by using the method of claim 13.

* * * * *